July 7, 1936.  W. RAISCH  2,046,845
TREATMENT AND DISPOSAL OF SEWAGE AND THE LIKE
Filed Jan. 26, 1935
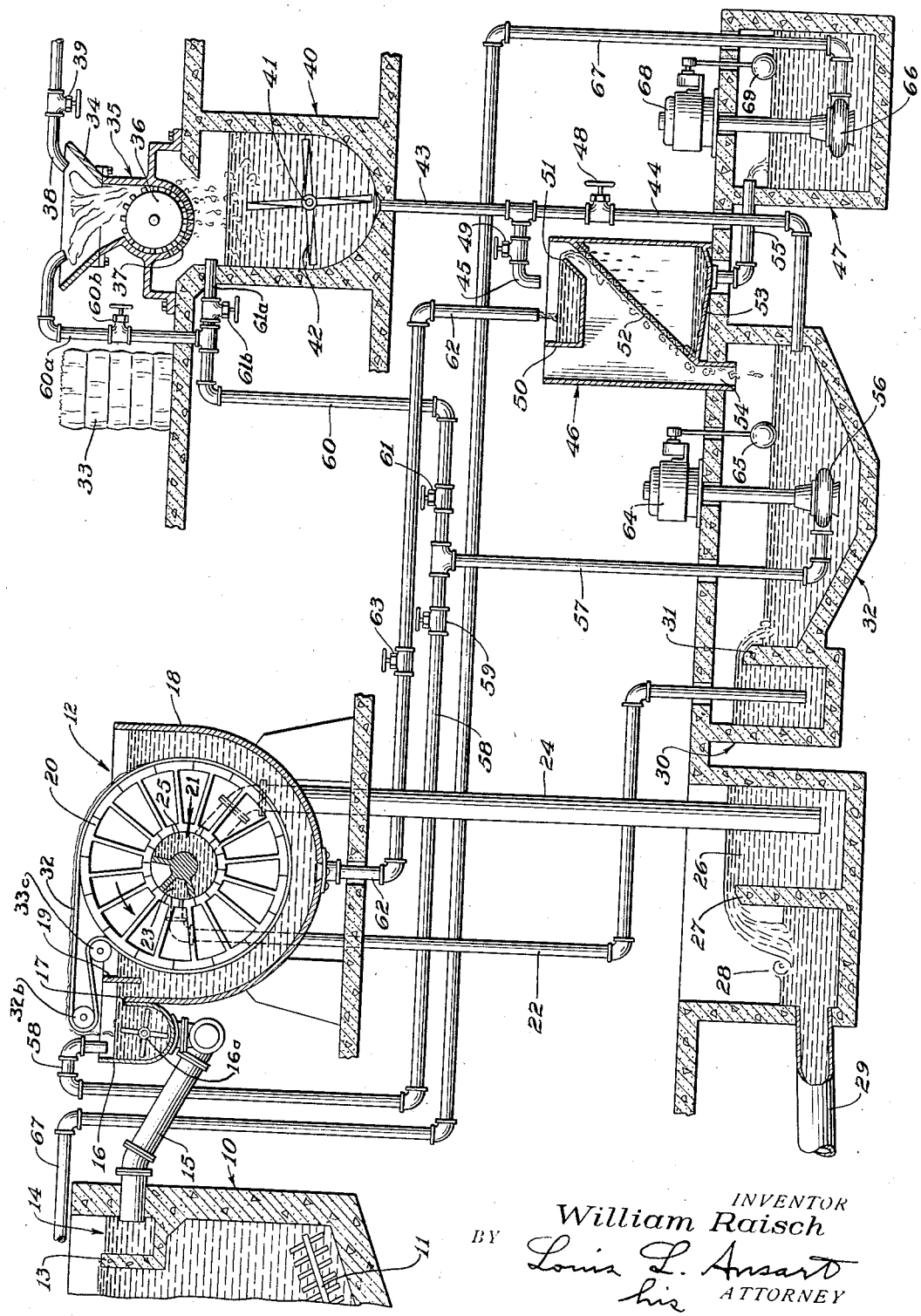
INVENTOR
William Raisch
BY Louis L. Ansart
his ATTORNEY Patented July 7, 1936

2,046,845

UNITED STATES PATENT OFFICE 2,046,845

TREATMENT AND DISPOSAL OF SEWAGE AND THE LIKE

William Raisch, Forest Hills, N. Y., assignor to Underpinning & Foundation Company, Inc., New York, N. Y., a corporation of New York Application January 26, 1935, Serial No. 3,537

11 Claims. (Cl. 210—2)

This invention relates to the treatment and disposal of sewage and the like and more particularly to methods of and apparatus for filtration adapted for use in the removal of very fine particles of solids from sewage and the like, generally in dilute form such as sewage from which the larger solids have been removed as by sedimentation, and the production of a residue containing said fine particles, which residue is stable and may be used as a fertilizer base or may readily be burned.

An important object of the invention is to provide for obtaining the above mentioned and other desired results in novel and advantageous ways. Another object is to provide novel and advantageous methods for producing such results. A further object relates to the provision of novel and advantageous forms of apparatus whereby such results can be obtained.

In the Raisch and Wright patent, No. 1,937,481, granted November 28, 1933, there was disclosed the use of cellulose pulp or the like to assure the formation on a filter of a cake of a requisite thickness to obtain filtration of requisite refinement, the removal of such cake from the filter and the repulping of the removed cake with fresh sewage or liquid to be filtered, and the repeated formation and removal of cakes containing the same material as the first cake. Eventually the pulp becomes exhausted, due for example to collection of sewage solids therein, and is replaced by a batch of fresh pulp, the discarded pulp being disposed of in any suitable manner, as by incineration.

Without such reuse of the cellulose or paper pulp, about twenty tons of paper pulp would be necessary to treat one million gallons of sewage, whereas with such reuse of the paper pulp only about three-quarters of a ton would be required for the same work. It was found, however, that the pulp clogged the filter more rapidly than was expected and that its useful life was substantially terminated when the pulp had accumulated 20% or less of its weight in sewage solids. Even with the best grade of pulp, the rate of filtration was reduced by approximately 50% after use for one-half hour in the filter. In improving results in this line it was found necessary, in order to maintain a suitable rate of filtration either to maintain the pulp in better condition or to build a filter unit 100% greater in size which would be decidedly uneconomical. Also a slime formation occurred in the pulp, due to bacterial action, and the pulp cake soon became substantially impervious.

Later improved results were obtained by washing fresh pulp before use for filtration, so as to remove the finer pulp fibers and various particles of impurities which would tend to clog the filter and also to impair the clarity of the filtrate, and also by washing batches of exhausted pulp withdrawn from the main filtration system to remove sewage solids and pulp fines and then returning the washed pulp to the filtration system. My co-pending application Serial No. 692,435, filed October 6, 1933, relates to such washing of the pulp.

In carrying out the present invention, very advantageous and consistent results are obtained by bleeding some of the pulp out of the filter during its operation. The material in the filter pan or tank, which consists principally of pulp and sewage solids, has a consistency of about ½% and flows easily, thus rendering it easy to transfer the material to a washer and to regulate the flow by suitable means such as a valve to suit requirements of operation. The washed pulp first introduced into apparatus has a high rate of filtration and by continuously bleeding the used pulp and contamination materials from the filter pan to the washer a fairly uniform and high rate of filtration can be obtained. The washing serves not only to remove foreign and contaminating material and thus clean the pulp but also to remove, as in the original washing, extremely fine and undesirable particles of fibre resulting principally from the beating action in repulping filter cake with sewage flowing to the filter. Undue thinning of the filter cake may be avoided by diluting the washed pulp and returning it to the filter system as fast as it is required.

In this way, not only can a uniform high rate of filtration be maintained but the quality of the filtrate may be improved due not only to removal of the very fine particles of fibre produced as by distintegration in the repulping operation but also to avoidance of formation of the bacterial slime which heretofore was present and passed out of the filter unit with the filtrate in the form of colloid. Furthermore after introducing a charge of fresh pulp into a filter, the filter can be run almost indefinitely without any definite unloading. However, due to the gradual disintegration of the fibre into particles too fine to be useful and the removal of these particles by the washing operation the pulp in the unit would gradually be reduced and eventually would be completely removed. Such losses of pulp may be made up by the addition at suitable intervals of fresh pulp equivalent in amount to such losses. By this practice the amount of pulp necessary to treat one million gallons of sewage was reduced to less than 100 pounds (air dry weight) of pulp as compared with 1500 pounds required for reuse without the washing feature.

From the washer the dirty water containing the pulp fines and fine sewage solids as well as colloids and bacteria may be passed to a settling tank which may be the settling tank from which the effluent passes to the filtration unit. Under such conditions the pulp fines with their coating of sewage solids will aid the settling of sewage solids which will tend to stick to said fines and be carried down thereby, a coagulating action being effected. The presence of the pulp fines in the sludge will also facilitate materially the dewatering of the sludge.

The cloudy liquid, drawn through the filter in building up the filter cake at each revolution of the filter, is proportionate in amount to the capacity of the filter, inasmuch as the speed of the unit governs its capacity and likewise the amount of cloudy liquid. Furthermore, the greater the speed of the filter the greater the rate of filtration and the more rapid clogging of the pulp, thereby rendering faster washing necessary. This indicated the existence of a more or less definite relation between the rate of washing the pulp and the rate of return of the cloudy liquid. Inasmuch as the pulp bled from the filter is, after washing, of high consistency and therefore substantially impossible to pump, it must be diluted to a certain extent. Heretofore, this dilution was accomplished by adding fresh water, thus placing an additional load on the filter.

According to the present invention, the washed pulp is collected at whatever rate it is washed and the requisite dilution thereof is provided by the addition thereto of the cloudy filtrate at the rate it also is produced, the return of this mixture to the filter being controlled preferably automatically. This decreases the load of the filter by eliminating the fresh water addition and also secures a constant return of washed pulp to the machine in strict proportion to the rate at which it is produced and, by suitable control means, eliminates the necessity for manual supervision. The amount of cloudy filtrate or liquid is in direct proportion to the speed of filtration and the clogging of the pulp cake is in direct proportion to the rate of filtration. Consequently a contant return of pulp is assured and the thickness of the filter cake can be maintained as required to provide for the best filtration at all times, which last feature appears to be of greater importance than anything else in making the entire method practical as well as economical.

Other features, objects and advantages will appear upon consideration of the following description and of the drawing, in which the figure is a vertical section of an approved embodiment of apparatus for carrying out the invention.

Referring to the drawing, reference numeral 10 designates a settling tank having a conical bottom and a revolving device 11 for moving the settled sludge to the center of said conical bottom from which it may be withdrawn. Preferably the sludge thus withdrawn is dewatered by means of a vacuum filter and the sludge thus dewatered is disposed of in any suitable manner as by incineration. The dewatered sludge may, however, be used as a fertilizer base or for other purposes. Preferably, the sewage or the like is freed of bulky solids, by suitable means such as bar screens, grit chambers and the like, before passing into the settling tank 10 where a considerable portion of the sewage solids settle to the bottom and the supernatant liquid containing fine particles of solids passes over an overflow wall 13 into a launder 14 surrounding the tank.

From the launder 14 the overflow liquid may pass through a duct or pipe 15 to a mixing or repulping vessel or trough 16 containing a rotary beater or agitator 16a and having at one side an overflow wall 17 over which the sewage passes into a tank or pan 18 of a filter 12, the incoming sewage being directed toward the bottom of the pan 18 by means of a baffle 19. The vacuum filter may also be provided with a filter drum 20 rotated so that its surface moves downwardly adjacent to the baffle 19 as indicated by an arrow on the drawing. The filter drum 20 may be provided at its periphery with a series of chambers or sections (not shown) extending from end to end of the drum and covered by means which may include a filter fabric of a suitable character, for example, cloth woven from strands of textile material or from wire or other metallic strands. The various sections or compartments may be connected at one or both ends of the drum with a suction or vacuum valve 21 so constructed that each section as it passes into the liquid in the filter pan 18 is subjected to a vacuum to draw filtrate therethrough, this general condition being maintained until the cake formed on the section is about to be discharged therefrom.

The vacuum produced at the valve 21 may be obtained in any suitable manner, but preferably by a cloudy filtrate barometric leg 22 connected with a chamber 23 of the valve 21 so as to act on the filter sections upon their passage beneath the surface of the liquid in the pan 18 and draw therethrough the cloudy filtrate produced during the initial formation of the cake, and by a clear-filtrate barometric leg 24 connected with a chamber 25 of the valve 21 so as to act on the filter sections after they leave the zone of influence of the cloudy-filtrate barometric leg 22 and draw clear filtrate therethrough. The clear filtrate barometric leg may discharge into a sump or tank 26 having an overflow wall 27 over which the filtrate or filtered effluent passes into a tank or compartment 28. From this compartment the filtered effluent flows through a pipe or line 29, preferably leading to sterilizing means where the liquid may be treated by chlorinization. The cloudy filtrate passes from the barometric leg 22 into a tank or compartment 30 having an overflow wall 31 over which the liquid flows into a sump 32 from which it may be returned by means to be described hereinafter to the sewage stream flowing to the filter. Preferably the cloudy filtrate is, as hereinafter described, mixed with washed pulp or fresh pulp and returned to the repulping trough 16.

The filter just described may be substantially the same as that disclosed in the patent to Young and Wright, No. 1,472,574, granted October 30, 1923, and the filter and repulping device may be operated substantially in the manner disclosed in the Raisch and Wright Patent No. 1,937,481, granted Nov. 28, 1933. In this connection it should be understood that other forms of settling tanks and filters may be used. As illustrated, the cake is stripped from the filter drum 20 and discharged into the repulping trough by means of a plurality of strings 32a passing around the drum and around guide rollers 32b and 32c.

The fresh fibrous material for the pulp may be supplied in the form of bales 33 of waste paper, paper board, etc., and the material from said bales may be fed gradually into a hopper 34 of a shredding device 35 including a rotary shredder 36 located above and closely adjacent to a curved perforate part or grating 37, said rotary shredder being rotated in the indicated direction by any suitable means. Water may be supplied to the hopper, during the shredding operation, through a pipe or line 38 provided with a valve 39, and the shredded paper and water may be discharged from the shredder into a beater or agitator tank 40 where the shredded paper and water may be agitated by a rotary beater having a shaft 41 and arms 42, preferably arranged on the shaft so as to produce a feeding movement in a direction along said shaft, the pulp being gradually advanced to a discharge pipe 43.

The discharge pipe 43 may deliver the pulp to a pipe or branch 44 leading substantially directly to the sump 32 which receives the cloudy filtrate, or to a branch 45 discharging into a pulp washer 46 from which the washed pulp passes to the sump 32 and the dirty water to a sump or tank 47 from which the dirty water may be returned to the settling tank 10 by means to be described hereinafter, the branch through which the pulp is passed being determined by opening a valve 48 in the branch 44 and closing a valve 49 in the branch 45 or vice versa.

The washer 46 may contain within a suitable casing, preferably of steel plates, a pan or receptacle 50 from which the pulp is discharged over an inclined overflow wall 51 upon the upper part of a screen 52, preferably of a mesh within a range of 60—40 to 40—40 and set at an angle of between 50 and 60 degrees from the horizontal. In the washing operation, the pulp and water discharged from the pan fall upon the upper part of the screen 52—the dirty water containing impurities and fine pulp particles passing through the screen and falling into a basin 53 at the bottom of the washer, and the clean particles of pulp, which are too large to pass through the screen, traveling down the screen to an outlet 54 through which they are discharged into the cloudy-filtrate sump 32. The dirty water in the basin 53 of the washer may be discharged through a pipe 55 into the tank or sump 47.

The mixture of fresh pulp and cloudy filtrate or other make-up water in the sump 32 may be passed directly to the repulping trough 16 for use in the filter or may be returned to the shredder 35 for recirculation. These results may be obtained by means of a pump 56 in the sump and a pipe or duct 57 having a branch 58 leading to the repulping trough and controlled by a valve 59, and a branch 60 leading to the shredding and agitating means and controlled by a valve 61. By closing the valve 59 and opening the valve 61 the pulp may be returned to the shredding and agitating means, and by opening the valve 59 and closing the valve 61 the pulp may be passed to the repulping trough 16. The pulp passed through the pipe 60 may be discharged into the shredder through a branch 60a controlled by a valve 60b, or into the agitator through a branch 61a controlled by a valve 61b.

The apparatus for preparing the fresh pulp and supplying it to the repulping trough, while in many respects similar to that disclosed in said Raisch and Wright patent, No. 1,937,481, differs therefrom in many respects but more particularly in the arrangement whereby the pulp may be washed and may be diluted by the cloudy filtrate. This arrangement is also particularly adapted for use in connection with handling and cleaning the pulp in use for filtration so that the filter can be run continuously for an indefinitely long period without the addition of any great amount of fresh pulp—the fresh pulp being added to replace the very fine particles produced principally in the repulping device. Preferably the contaminated pulp is bled from the bottom of the filter pan 18 and passed through a pipe or line 62 to the pan 50 of the washer 46, the flow of the pulp through the line 62 being controlled in any suitable manner as by a valve 63.

The washing of the contaminated pulp and the return of the washed pulp to the filter may be effected in various ways. For example contaminated pulp could be drawn off without replacement until the pulp in the filter pan was thinned about as much as it could be done without substantial detriment to the quality of filtration and then the clean pulp, resulting from washing the withdrawn pulp, could be returned to the repulping device.

Preferably, however, the washing of the contaminated pulp and its return to the repulping trough 16 are substantially continuous operations. To this end, the pump 56 may be operated by a suitable motor 64 controlled by means including a float 65 so that as the mixture of pulp and cloudy filtrate in the sump 32 rises above a predetermined level the motor will be thrown into operation to drive the rotary pump 56 and force the mixture to the repulping trough 16, and when the mixture sinks to said predetermined level, the pump stops. For this operation, the valves 59 and 63 are open and the valves 61, 48, and 49 are closed. When fresh pulp is to be added, the valve 63 is closed to stop the flow of contaminated pulp to the washer and the fresh pulp may be prepared and supplied to the repulping trough as already described.

Preferably, also, the dirty water in the tank 47 is passed to the settling or sedimentation tank 10 by means of a pump 66 and a pipe 67, the pump being operated by a motor 68 controlled by means including a float 69 so that when the dirty water in the tank 47 rises above a predetermined level the pump 66 is started to pass the dirty water to the settling tank 10 where it acts as an aid to sedimentation, and, when the liquid level is again brought down to said predetermined level, the pump stops.

It will be seen that, whereas in the use of the apparatus of said Raisch and Wright Patent No. 1,937,481 the pulp was used in filter unit until exhausted and then the filter unit was thrown out of normal use and the whole charge of contaminated pulp was discharged preparatory to the introduction of a charge of clean pulp and subsequent operation of the filter unit. The operation of a filter unit in accordance with the present invention is continuous and with the preferred form of apparatus there is substantially a continuous, automatically controlled washing of the pulp and return of the washed pulp to the repulping trough of the filter unit. Obviously one shredding and agitating means could be used with a plurality of filter units.

In recapitulation, the operation of the apparatus is substantially as follows: In starting the treatment of the settled sewage, that is the effluent from the sedimentation tank 10, a suitable charge of material, such as paper pulp and water in the requisite proportions, must be introduced in filter pan 18, preferably by feeding it in gradually. Although such introduction may be done in various other ways, it is preferably done in either of the following general ways: The material may be shredded in the shredder 35 while liquid such as water is added and the mixture thus formed discharged downwardly through the grating 37 into the agitator tank 40, the amount of water being such as to produce the desired consistency in the tanks 40. In the event that the pulp thus produced is sufficiently free from impurities, the valve 49 may be closed and the valve 48 opened to feed the pulp directly into the tank or sump 32. From the tank 32 the mixture may be pumped through the line 57 and branch 58 to the repulping trough 16, the valve 59 being open and the valve 61 closed. Also, if recirculation be desired, the valve 59 may be closed and valve 61 and either of values 60b or 61b opened.

The second way of preparing the fresh pulp and feeding it to the filter unit involves washing the pulp to remove impurities and fine pulp fibres which would otherwise tend to have a deleterious effect on the filtrate and the rate of filtration. The material may be shredded and mixed with water in the agitator tank 40 as before. The valve 48 being closed and the valve 49 open, the pulp and water will flow into the pan 50 and overflow upon the screen 52—the dirty water passing through the screen and falling into the basin 53 from which it passes through a pipe 55 to the tank 47, and the clean pulp passing down over the screen to the outlet 54 from which is passes into the sump or tank 32. If additional water is desired in this tank, it may be added through the branch 44 either before or after the shredding of the material, or it may be added in any other suitable way. Of course during the usual operation of the apparatus there is usually a substantial amount of cloudy filtrate in the sump 32.

After the original and sufficient charge of pulp has been introduced into the filter unit, and the apparatus is in normal operation, the dilute sewage or effluent from the settling tank 10 will pass through the pipe 15 into the repulping trough 16 where it will, by means of the rotary agitator 16a, be thoroughly mixed with the pulpy material therein. The mixture thus formed will pass over the overflow wall 17 into the filter pan, the mixture being added substantially uniformly to the filter pan along the length of the overflow wall. As each suction compartment at the periphery of the filter drum moves into the liquid in the filter pan the cellulose pulp and sewage solids are drawn against the filter medium at the outer side thereof and due to the thinness of the cake at this stage impurities as well as fine particles of cellulose pulp may be drawn into the compartment, the cloudy filtrate thus formed passing down the barometric leg 22 to the tank 30 and then to the sump 32. As the compartment continues its movement, the cake thickens and the filtrate which is now clear filtrate is drawn out through the barometric leg 24. Eventually the compartment passes upwardly out of the liquid in the tank and the cake over this segment is stripped from the drum by the flexible members or strings 32a and dumped into the trough. This operation is continued for each and every compartment. If this action be repeated without any other change, the sewage solids and fine pulp particles resulting from the action of the agitator or beater 16a will tend to clog the cake and materially reduce the rate of filtration.

To avoid such reduction in the rate of flow, contaminated pulp in the filter pan may be bled from the bottom of the pan at the proper rate, as controlled by the valve 63, and passed through the washer 46, the washed pulp passing into the sump 32 where it is diluted by the cloudy filtrate. When the mixture rises above a predetermined level the motor 64 is started and operates the pump 56 to return the mixture to the repulping trough and, when the mixture sinks to said level or below, the pump is stopped.

For all practical purposes the feed of the mixture from the sump 32 to the repulping trough is practically continuous. However, the pulp is very slowly broken down into fine particles which pass out of the washer 46 with the dirty water and are lost for cake-forming purposes. When it is necessary to replace the pulp particles thus lost, fresh pulp prepared without washing may be admitted gradually or otherwise to the sump 32 through the pipe 44, the bleeder valve 63 being closed, if desired, for a suitable interval. If, however, recirculation through the shredding and agitating means be desired, it will be necessary to close the valve 63 in the bleeder line 62 and also the valve in the line 58 discharging into the repulping trough. As soon as the desired amount of fresh pulp has been added, the system should, by proper adjustments of the valves be restored to normal working condition.

Furthermore the fine particles of cellulose pulp, either fresh or contaminated with sewage solids, are passed from the dirty water collecting tank 47 to the settling tank or to the sewage stream flowing thereto and aid in the settling of solids in said settling tank. The sludge drawn from the bottom of the settling tank is usually dewatered by filtration which is especially difficult due to the slimy character of the sludge. It will be evident that the pulp fines will act to render the filter cake, formed from the sludge, more porous to facilitate dewatering and to prevent clogging of the filter due to the slimy character of the sludge. Thus there are obtained by the use of waste material the same general results as it has heretofore been proposed to obtain by the use of carefully prepared colloidal cellulose.

It will be evident that the improvements of the present invention enable continuous operation of the filter and a very substantial increase of capacity, due to such factors as continuous operation of the filter and maintenance of the filter cake in such condition that the filtrate may be drawn through it at a high rate without sacrifice of clarity.

It should be understood that various changes may be made in the various features and that certain features may be used without others without departing from the true scope and spirit of the invention.

Having thus described my invention, I claim:

1. The method of filtering sewage, which comprises the addition of cellulose pulp to a sewage stream, the passing of the mixture thus produced to a filter thereby producing a cake comprising cellulose pulp contaminated with sewage solids, the repeated removal of the cake from the filter and return thereof to the sewage stream before it reaches the filter, the substantially regular withdrawal at a slow rate of contaminated pulp from the unfiltered mixture of pulp and sewage, the washing of the withdrawn pulp, and the return of the washed pulp to the sewage stream on its way to the filter.

2. The method of filtering sewage, which comprises the addition of cellulose pulp to a sewage stream, the passing of the mixture to a filter thereby producing a cake of pulp contaminated with sewage and in connection therewith cloudy filtrate and then clear filtrate, the repeated removal of the cake from the filter and return thereof to the sewage stream before it reaches the filter, the bleeding of contaminated pulp from the unfiltered mixture, the washing of the bled-off pulp, the dilution of the washed pulp with cloudy filtrate, and the return of the diluted pulp to the sewage stream before it reaches the filter.

3. The method of treating sewage, which comprises the settling of all but the very small solids out of a sewage stream, the addition of cellulose pulp to the sewage stream after such settling, the passing of the mixture thus formed to a filter thereby producing a cake of pulp contaminated with sewage solids as well as cloudy filtrate during the formation of the cake and clear filtrate thereafter, the repeated removal of the cake from the filter and return thereof to the sewage stream before it reaches the filter, the bleeding of contaminated pulp from the mixture, the washing of the bled-off pulp to separate therefrom dirty water containing sewage solids and pulp particles so fine as to interfere with filtration, the return of the washed pulp to the sewage stream before it reaches the filter, and the return of the dirty water to the sewage stream so that the pulp fines in the dirty water may assist in the original settling.

4. The method of treating sewage in a sewage stream, which comprises a preliminary settling to reduce the sewage-solid content, a subsequent filtration aided by the use and reuse of cellulose pulp and the production alternately of cloudy filtrate and clear filtrate, a gradual withdrawal of contaminated pulp from use for filtrate, washing such gradually withdrawn pulp and thereby producing clean pulp and dirty water including pulp fines coated with sewage solids, diluting said clean pulp with cloudy filtrate and restoring it to use in filtration, and using said pulp fines to aid in said settling.

5. The method of treating sewage which comprises settling the sewage to produce dilute sewage containing only finely divided solids, passing a stream of said dilute sewage to a filter, adding cellulose pulp to said stream before it reaches the filter to aid in forming a cake, removing the cake from the filter and again combining it in the form of pulp with sewage on its way to the filter, maintaining the mixture of pulp and sewage on its way to the filter in substantially uniform condition by the continuous removal of sewage solids from the mixture, and utilizing small particles of contaminated pulp lost in said removal of sewage solids to aid said settling.

6. In apparatus for treating sewage, sedimentation means for settling solids out of the sewage and discharging dilute sewage therefrom, a rotary filter unit to receive a stream of dilute sewage from said sedimentation means and filter the same by the use of cellulose pulp, said filter unit including a rotary drum and a pan in which the drum rotates, means for mixing the cellulose pulp with the sewage stream before the stream reaches the filter unit so that the pulp stream reaches the filter unit so that the pulp will repeatedly be used to form a cake which is then removed from the drum and again mixed with the sewage stream, means for withdrawing contaminated pulp from the pan of the unit, means for washing the contaminated pulp to remove the sewage solids and fine particles of pulp, and means for passing such sewage solids and fine pulp particles to the sedimentation means to assist the settling action.

7. In apparatus for treating sewage, a vacuum filter including a rotary drum and a pan in which said drum rotates, means for directing a sewage stream to said filter including a repulper in which cellulose pulp is mixed with the sewage before reaching the filter to assist in forming a filter cake, means for removing the cake from the drum and discharging it into the repulper, means for bleeding contaminated pulp and sewage solids from the pan, a washer to which the bled-off matter is delivered, and means for diluting the washed pulp and returning it to the repulper.

8. In apparatus for filtering sewage with the aid of a cellulose pulp or the like in forming a filter cake, the combination with a rotary vacuum filter unit comprising a filter pan and a filter drum therein, a repulping trough receiving a stream of sewage and delivering it to said pan, means for discharging cake from the filter drum into said repulping trough and vacuum means to withdraw cloudy filtrate and then clear filtrate at each revolution of the drum; of a pulp-dilution tank in which cloudy filtrate collects, a bleeder line leading from the lower part of said filter pan, a pulp washer into which the bleeder line discharges and which discharges washed pulp into the dilution tank for dilution by said cloudy filtrate, and means for passing the diluted washed pulp to the repulping trough including a pump controlled as to operation by the height of the mixture in the dilution tank.

9. In apparatus for filtering sewage with the aid of cellulose pulp or the like in forming a filter cake, the combination with a rotary vacuum-filter unit comprising a filter pan and a filter drum therein, repulping means receiving a stream of sewage and delivering it to said pan, means for discharging cake from the filter drum into said repulping means and vacuum means to withdraw cloudy filtrate and then clear filtrate at each revolution of the drum; of a pulp dilution tank in which the cloudy filtrate collects, a fresh pulp shredding and agitating means, a pipe with a valve therein for passing fresh pulp to the pulp dilution tank, a pump for withdrawing diluted pulp from the pulp dilution tank, branches with valves therein for passing the material from the pump either to said repulping means or to said shredding and agitating means for recirculation, a pulp washer to discharge washed pulp into said dilution tank, and a pipe with a valve therein for bleeding contaminated pulp from said filter pan and delivering it to said washer.

10. In apparatus for filtering sewage with the aid of cellulose pulp or the like in forming a filter cake, the combination with a rotary vacuum filter unit comprising a filter pan and a filter drum therein, repulping means receiving a stream of sewage and delivering it to said pan, means for discharging cake from the filter drum into said repulping means and vacuum means for withdrawing cloudy filtrate and then clear filtrate at each revolution of the drum; of a cloudy-filtrate tank to receive said cloudy filtrate, a fresh-pulp-preparing means, a fresh-pulp line with a valve therein for passing pulp to the cloudy-filtrate tank for dilution therein, a pump for withdrawing diluted pulp from the cloudy-filtrate tank, branches with valves therein for passing the diluted pulp from the pump either to said repulping means or to said fresh-pulp-preparing means for recirculation, a pulp washer to discharge washed pulp into said cloudy-filtrate tank, a pipe with a valve therein for bleeding contaminated pulp from said filter pan and delivering it to said washer, and a branch with a valve therein leaving the fresh-pulp line between the valve therein and the fresh-pulp-preparing means and adapted to discharge the fresh pulp into the washer.

11. The method of sewage treatment and disposal which comprises settling sewage to separate sludge therefrom and produce dilute sewage containing only finely divided solids, passing said sludge to a dewatering filter, passing said dilute sewage in a stream to a clarifying filter, adding fibrous pulp to such sewage stream on its way to the clarifying filter to aid in forming a cake, repeatedly removing the cake from the clarifying filter and again mixing it in the form of pulp with the sewage stream on its way to the clarifying filter, maintaining the mixture on its way to the clarifying filter in a substantially uniform condition by the substantially continuous removal therefrom of pulp containing sewage solids and contaminated pulp fines, the production of fresh pulp to replace the loss in pulp fines, the removal of pulp fines from the fresh pulp, and the use of the fresh-pulp fines in the settling operation to combine with the sludge so as to produce a porous cake in the dewatering operation.

WILLIAM RAISCH.